US008558183B2

(12) United States Patent
Nakatsugawa

(10) Patent No.: US 8,558,183 B2
(45) Date of Patent: Oct. 15, 2013

(54) RADIOLOGICAL IMAGE CONVERSION PANEL, MANUFACTURING METHOD THEREOF AND RADIOLOGICAL IMAGE DETECTION APPARATUS

(75) Inventor: Haruyasu Nakatsugawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/478,942

(22) Filed: May 23, 2012

(65) Prior Publication Data

US 2013/0001425 A1 Jan. 3, 2013

(30) Foreign Application Priority Data

Jun. 30, 2011 (JP) .................................. 2011-146787

(51) Int. Cl.
*G01T 1/20* (2006.01)
(52) U.S. Cl.
USPC ........................................................ 250/366
(58) Field of Classification Search
USPC .............................................. 250/366, 361 R
See application file for complete search history.

(56) References Cited

U.S. PATENT DOCUMENTS

| 4,935,617 A * | 6/1990 | Anno et al. ............. 250/214 VT |
| 2003/0062481 A1 | 4/2003 | Okada et al. |
| 2006/0065862 A1 | 3/2006 | Takasu |
| 2011/0006213 A1 | 1/2011 | Sato et al. |

FOREIGN PATENT DOCUMENTS

| JP | 01315930 A * | 12/1989 |
| JP | 2003-066147 A | 3/2003 |
| JP | 2006-052979 A | 2/2006 |
| JP | 2006-098241 A | 4/2006 |
| JP | 2010-025620 A | 2/2010 |
| JP | 2011-017683 A | 1/2011 |

\* cited by examiner

*Primary Examiner* — Kiho Kim
(74) *Attorney, Agent, or Firm* — Jean C. Edwards; Edwards Neils PLLC

(57) ABSTRACT

A radiological image conversion panel includes: a scintillator made of a phosphor which emits fluorescence when exposed to radiation, in which a fluorescence emitting surface of the scintillator is bonded to a sensor panel having a pixel array detecting the fluorescence generated at the scintillator, through an adhesive layer, the scintillator includes a group of columnar crystals which are obtained by growing crystal of the phosphor into columnar shape, the fluorescence emitting surface is configured by a set of tip parts of the columnar crystals, at least edge portions of the fluorescence emitting surface are flattened by filling between the group of columnar crystals with filler, and the filling depth of the filler at a center portion of the fluorescence emitting surface is smaller than that at the edge portions of the fluorescence emitting surface.

18 Claims, 7 Drawing Sheets

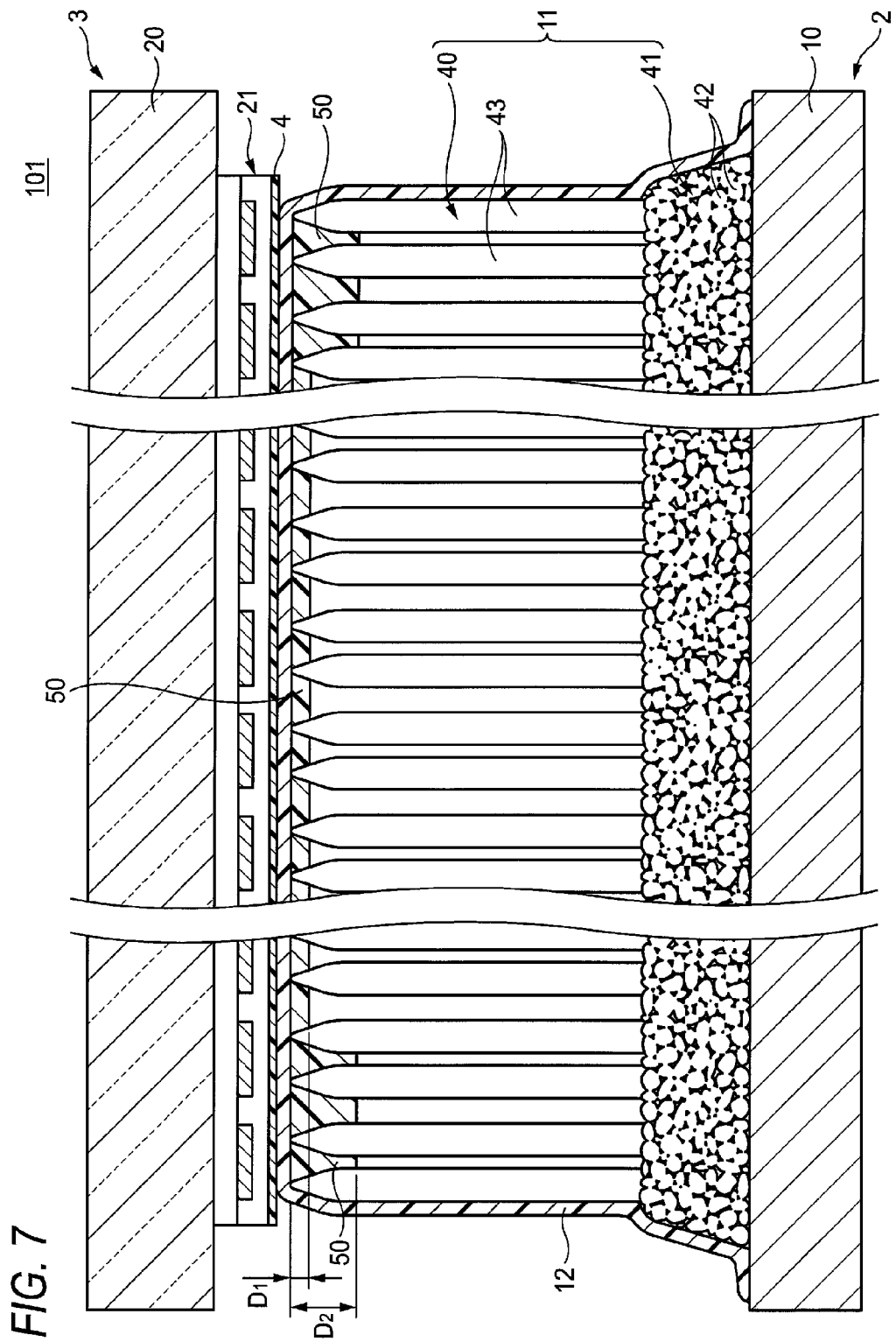

RADIOLOGICAL IMAGE CONVERSION PANEL, MANUFACTURING METHOD THEREOF AND RADIOLOGICAL IMAGE DETECTION APPARATUS

CROSS-REFERENCE TO RELATED APPLICATIONS

This application is based on and claims priority under 35 USC 119 from Japanese Patent Application No. 2011-146787 filed on Jun. 30, 2011; the entire content of which is incorporated herein by reference.

BACKGROUND

1. Technical Field

The present invention relates to a radiological image conversion panel, a manufacturing method of the radiological image conversion panel, and a radiological image detection apparatus.

2. Related Art

In recent years, a radiological image detection apparatus that utilizes a flat panel detector (FPD) detecting a radiological image and generating digital image data has been put into practical use. The radiological image detection apparatus has been distributed rapidly for the reason that an image can be instantly confirmed as compared with an imaging plate constituting with photostimulable phosphor (accumulative phosphor). Various types of radiological image detection apparatus are available and one of them is known as an indirect conversion type radiological image detection apparatus.

The indirect conversion type radiological image detection apparatus has a radiological image conversion panel and a sensor panel. The radiological image conversion panel has a scintillator which generates fluorescence when exposed to radiation and the sensor panel has a pixel array for detecting the fluorescence of the scintillator. The scintillator and the pixel array are bonded through an adhesive layer. The radiation transmitted through a subject is once converted into light by the scintillator, the fluorescence of the scintillator is converted into an electrical signal by the pixel array, and thus digital image data is generated therefrom. The scintillator and the pixel array, for example, are bonded by moving the roller and loading it on the supporting substrate of the radiological image conversion panel which supports the scintillator.

Scintillator typically includes alkali halide phosphors such as CsI (cesium iodide) or NaI (sodium iodide), and is composed of a group of columnar crystals in which crystals of the phosphors have been grown into columnar shapes on a support by a vapor deposition method. The columnar crystals formed by the vapor deposition method do not contain impurities such as a binder, and have a light guide effect that guides the fluorescence generated in the columnar crystals in a growth direction of the crystal so as to suppress the diffusion of the fluorescence. Thus, not only the sensitivity of the radiological image detection apparatus, but also the sharpness of the image can be improved (see, for example, Patent Document 1 (JP-A-2011-017683) and Patent Document 2 (JP-A-2003-066147)).

However, as in the scintillator formed out of the group of columnar crystals, because the fluorescence emitting surface to be bonded with the pixel array is composed by a set of the tip parts of columnar crystals and thus there are many empty places, it is difficult to get the bonding strength with the adhesive layer. Further, there might be occurred warpage at the radiological image detection apparatus, depending on the temperature variations of the environment and the temperature changes caused by the usage of the apparatus, due to the differences between the linear expansion rates of the supporting substrate that supports the scintillator of the radiological image conversion panel and of the sensor substrate that supports the pixel array of the sensor panel. In this case, there might be caused air gaps between the scintillator and the pixel array by their peeling. In addition, the air gap can be a factor of image defects or degradation of image sharpness by reflecting or scattering light. This peeling of the scintillator with the pixel array is prone to occur with starting from the edge portions of the scintillator.

Thus, in order to increase the bonding strength with the adhesive layer in the edge portions of the scintillator, a method in which the load applied on the edge portions becomes significantly higher compared to that applied at the center portion is considered when the scintillator is bonded with the pixel array. In addition, when the scintillator is bonded with the pixel array by loading with the rollers, the load applied on the edge portions of the scintillator usually becomes relatively greater. However, the crystals of the alkali halide phosphors such as CsI or NaI are hard and are also vulnerable, and specifically, each columnar crystal is prone to be broken, because there are pores around it and they are independent of the adjacent columnar crystal.

Thus, as in the radiological image detection apparatus described in Patent Document 2, the diameters of the columnar crystals in the edge portions of the scintillator become bigger than that in the center portion of the scintillator. Accordingly, because the strengths of the columnar crystals in the edge portions of the scintillator may become higher, the columnar crystals in the edge portions are prevented from being damaged by the load applied when the scintillator and the pixel array are bonded.

Further, as in the radiological image detection apparatus described in Patent Document 3 (JP-A-2010-025620), the fluorescence emitting surface of the scintillator to be bonded with the pixel array is flattened and at the same time the tip parts of the columnar crystals configuring the fluorescence emitting surface are integrated by filling between the tip parts of the group of columnar crystals with filler. Accordingly, because the strengths of the columnar crystals may become higher, the columnar crystals in the edge portions of the scintillator are prevented from being damaged by the load applied when the scintillator and the pixel array are bonded.

As in the manufacturing method of the scintillator in the radiological image detection apparatus described in Patent Document 2, when forming the scintillator by growing the crystals of phosphors by the vapor deposition method, the diameter distribution of the columnar crystals is done by controlling the internal temperature distribution of the surface of the supporting substrate on which the crystals are deposited. However, because the internal temperature distribution of the surface of the supporting substrate affects not only the diameters of the columnar crystals but also the lengths of the columnar crystals to produce a thickness distribution of the scintillator, it is very difficult to control the temperature distribution.

Further, as in the radiological image detection apparatus described in Patent Document 3, the filler is filled in an even depth between the tip parts of the group of columnar crystals throughout the entire scintillator. The light guide effect of the columnar crystal is to use total reflection due to the refractive index differences of the surrounding medium and the columnar crystal. If the filler is filled between the tip parts of the group of columnar crystals, the refractive index differences of the columnar crystals and the surrounding medium at the filled parts become smaller, and thus the light guide effect is weaken. Therefore, it is concerned that the image quality might be degraded.

SUMMARY

An illustrative aspect of the invention is to provide a radiological image conversion panel and a radiological image detection apparatus which have a good durability and a high image quality.

(1) According to an aspect of the invention, a radiological image conversion panel includes: a scintillator made of a phosphor which emits fluorescence when exposed to radiation, in which a fluorescence emitting surface of the scintillator is bonded to a sensor panel having a pixel array detecting the fluorescence generated at the scintillator, through an adhesive layer, the scintillator includes a group of columnar crystals which are obtained by growing crystal of the phosphor into columnar shape, the fluorescence emitting surface is configured by a set of tip parts of the columnar crystals, at least edge portions of the fluorescence emitting surface are flattened by filling between the group of columnar crystals with filler, and the filling depth of the filler at a center portion of the fluorescence emitting surface is smaller than that at the edge portions of the fluorescence emitting surface.

(2) According to another aspect of the invention, a radiological image detection apparatus includes: the radiological image conversion panel according to (1); and the sensor panel having the pixel array detecting the fluorescence generated by the scintillator of the radiological image conversion panel, in which the fluorescence emitting surface of the scintillator is bonded to the sensor panel through the adhesive layer.

(3) According to another aspect of the invention, a manufacturing method of a radiological image conversion panel includes: providing a scintillator including a group of columnar crystals which are obtained by growing crystal of a phosphor which emits fluorescence when exposed to radiation, into columnar shape, the fluorescence emitting surface of the scintillator being configured by a set of tip parts of the columnar crystals; applying energy-curing filler on at least at edge portions of the fluorescence emitting surface of the scintillator; reducing an amount of the filler held at a center portion less than that at the edge portions; pressurizing the filler applied on the fluorescence emitting surface toward the fluorescence emitting surface to fill between the group of columnar crystals with the filler; and curing the filler filled between the group of columnar crystals.

With the configurations discussed above, the fluorescence emitting surface of the scintillator can be flattened and the strength of columnar crystal can be increased by filling between the group of columnar crystals of the scintillator with the filler. Accordingly, the fluorescence emitting surface of the scintillator can be tightly bonded to the adhesive layer by applying a sufficient load thereto, and thus the sufficient adhesion strength between the fluorescence emitting surface and the adhesive layer can be obtained. Therefore, the peeling of the scintillator with the pixel array can be prevented from being occurred.

In addition, since the center portion of the scintillator has a big effect on the image quality of the area of interest of a subject, the weakening of the light guide effect of the columnar crystal can be suppressed by making the filling depth of the filler between the group of columnar crystals at the center portion relatively smaller. Therefore, the degradation of the image quality of the area of interest of the subject can be suppressed.

BRIEF DESCRIPTION OF THE DRAWINGS

FIG. 7 is a view schematically illustrating the configuration of a modified embodiment of the radiological image detection apparatus in FIG. 1.

DETAILED DESCRIPTION

Figure 1:
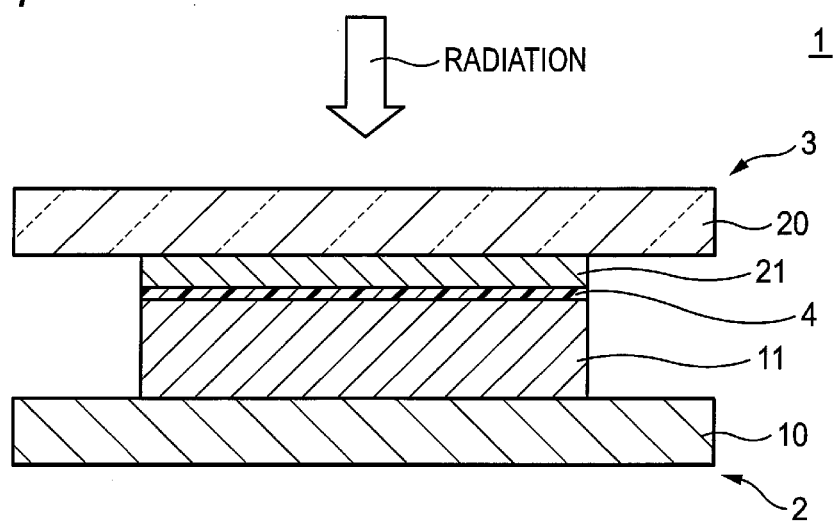
FIG. 1 is a view schematically illustrating the configuration of a radiological image detection apparatus according to an exemplary embodiment of the present invention.

FIG. 1 illustrates the configuration of a radiological image detection apparatus according to an exemplary embodiment of the present invention.

A radiological image detection apparatus 1 illustrated in FIG. 1 has a radiological image conversion panel 2 and a sensor panel 3.

The radiological image conversion panel 2 has a supporting substrate 10 and a scintillator 11 which is made of phosphors emitting fluorescence when exposed to radiation. The scintillator 11 is formed on the supporting substrate 10.

The sensor panel 3 has an insulating substrate 20 and a pixel array 21 installed on the insulating substrate 20. Each of the pixels that make up the pixel array 21 can detect the fluorescence generated at the scintillator 11 when exposed to radiation.

The scintillator 11 and the pixel array 21 are bonded to each other by an adhesive layer 4 which is interposed between them to couple the scintillator 11 and the pixel array 21 optically. The adhesive layer 4 is not specifically limited if it does not attenuate the fluorescence of the scintillator 11 and reaches the pixel array 21. The adhesive layer is not limited to one whose junction bonds the scintillator 11 and the pixel array 21 by the wettability-lost adhesion through solidification, but also includes one whose junction bonds both of them by the wettability-kept adhesion. Such adhesive layer 4 may be formed by, for example, an adhesive agent such as UV curing adhesive agent or heat-curable adhesive agent, room temperature curing adhesive agent or hot melting adhesive agent, a pressure sensitive adhesive agent such as rubber-based adhesive agent, silicone-based adhesive agent or acrylic-based adhesive agent, or a double-sided adhesive/pressure sensitive adhesive sheet in which the adhesive/pressure sensitive adhesive are installed on both side thereof. In addition, as the adhesive agent, from the viewpoint of not deteriorating the sharpness of the image, an adhesive agent made of a low-viscosity epoxy resin, which forms a sufficiently thin adhesive layer depending on the pixel size, is preferable. In addition, as the pressure sensitive adhesive agent, the acrylic-based adhesive agent is preferable, which is less degraded caused by light or oxidation.

The radiological image detection apparatus 1 is so called a surface-readable irradiation side sampling (ISS) radiological image detection apparatus, in which the radiation is transmitted through the sensor panel 3 and is incident to the scintillator 11 of the radiological image conversion panel 2. The fluorescence is generated in the scintillator 11 on which the radiation is incident, and then the generated fluorescence is detected by the pixel array 21 of the sensor panel 3. Since the radiation incident side of the scintillator 11, which generates a lot of fluorescence, is installed near to the pixel array 21, the sensitivity is improved.

Figure 2:
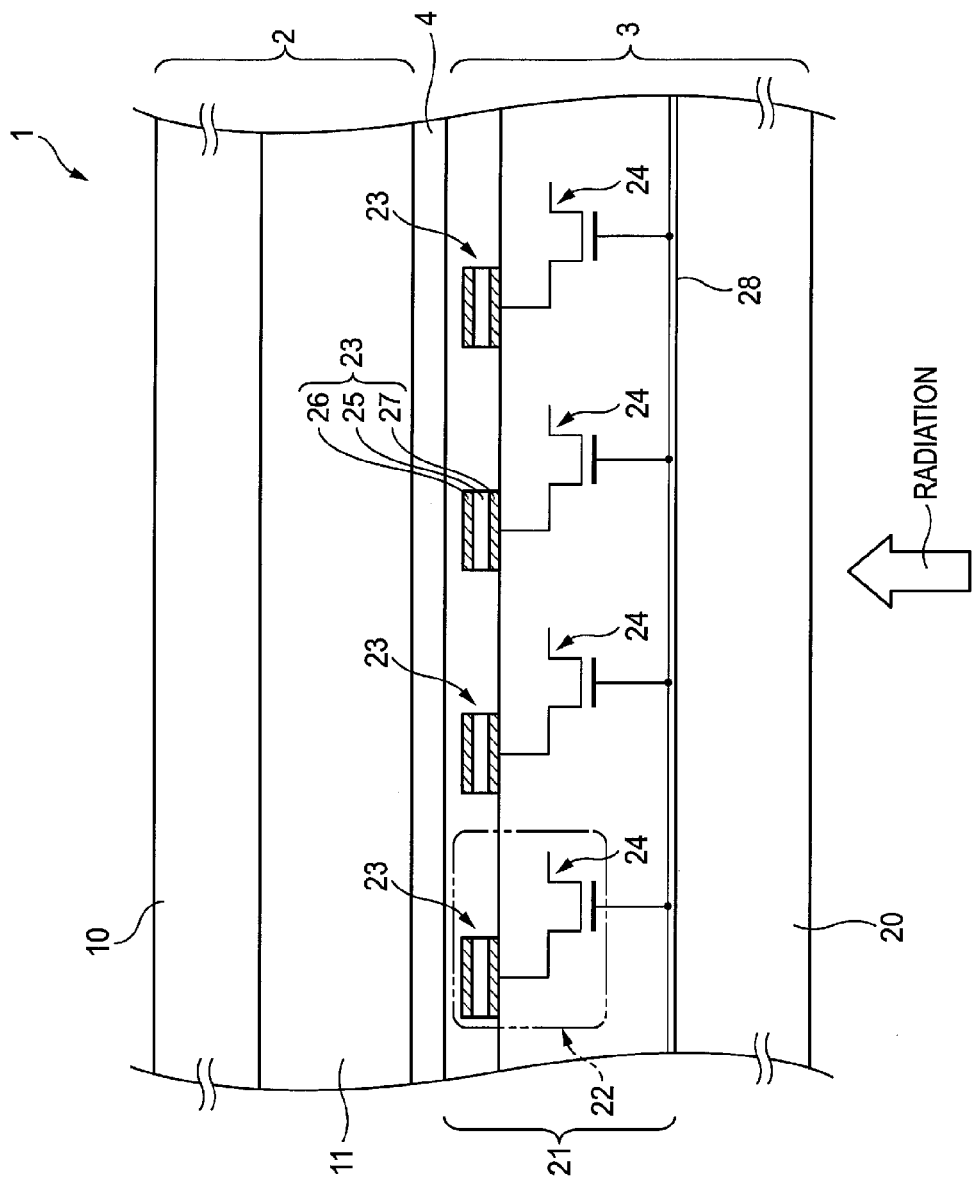
FIG. 2 is a view schematically illustrating the configuration of a sensor panel of the radiological image detection apparatus in FIG. 1.
Figure 3:
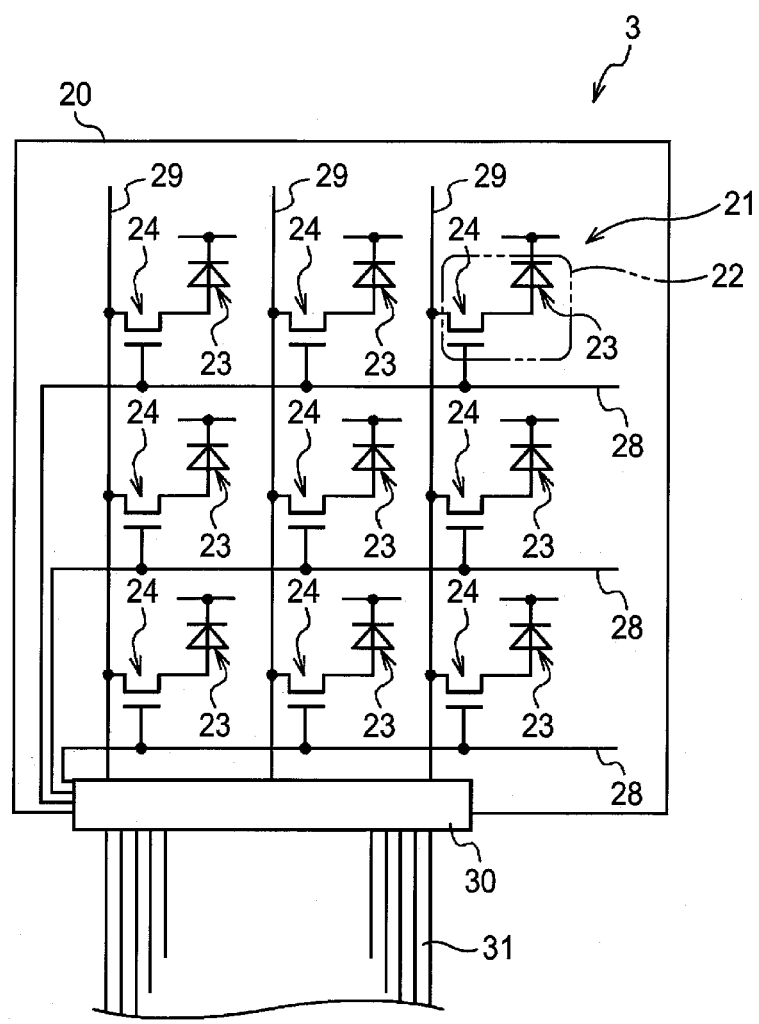
FIG. 3 is a view schematically illustrating the configuration of the sensor panel of the radiological image detection apparatus in FIG. 1.

FIGS. 2 and 3 illustrate the configuration of the sensor panel 3.

The pixel array 21 has a plurality of pixels 22 in two dimensional form arranged on the insulating substrate 20, and each pixel 22 is composed by a photoelectric conversion element 23 and a switching device 24.

The photoelectric conversion element 23 includes a photoconductive layer 25, which receives the fluorescence of the scintillator 11 and generates electric charges, and a pair of electrodes 26, 27 which are installed on the front and back surfaces of the photoconductive layer 25, respectively. The electrode 26 installed on the surface of the photoconductive layer 25 at the scintillator 11 side is a bias electrode for applying a bias voltage to the photoconductive layer 25, and the electrode 27 installed on the opposite surface is an electric charge collection electrode for collecting the electric charges generated by the photoconductive layer 25. The electric charge collection electrode 27 is connected to the switching device 24, and the electric charges collected by the electric charge collection electrode 27 are read out through the switching device 24.

A plurality of gate lines 28 and a plurality of signal lines (data lines) 29 are provided on the insulating substrate 20, in which the gate lines 28 are provided to extend in one direction (row direction) of the orientation directions of the pixels 22 arranged in two-dimensional form so as to turn ON/OFF the switching device 24 of each pixel 22, and the signal lines 29 are provided to extend in a perpendicular direction (column direction) to the gate lines 28 so as to read out electric charges through the switching devices 24 being turned ON. In addition, each of gate lines 28 and signal lines 29 is connected to a connection circuit 31 at a connection terminal portion 30 installed in an edge portion of the insulating substrate 20, and is connected to a circuit board (not shown) having a gate driver and a signal processing unit through the connection circuit 31.

The switching devices 24 are turned ON sequentially row by row in accordance with signals supplied through the gate lines 28 from the gate driver, respectively. Further, electric charges read out by the switching devices 24 being turned ON are transmitted as electric charge signals to the signal lines 29 and then supplied to the signal processing unit. Thus, the electric charges are read out sequentially row by row, and converted into electric signals in the signal processing unit so that the digital image data is generated.

As the insulating substrate 20, glass substrates are typically used, but flexible substrates can be used, which are formed using, for example, plastic, aramid, or bio nanofiber.

The photoelectric conversion element 23 can be configured by an amorphous silicon photodiode using, for example, the PN junction or PIN junction of amorphous silicon as a photoconductive layer 25. In addition, an organic photoelectric conversion film in addition to the amorphous silicon may be used as the photoconductive layer 25. Moreover, the organic photoelectric conversion film will be described below.

The switching device 24 can be configured by, for example, thin film transistor (TFT) using the amorphous silicon in an active layer. In addition, as the active layer of TFT, the amorphous oxide semiconductor materials and organic semiconductor materials can be used in addition to the amorphous silicon. Moreover, the amorphous oxide semiconductor materials and organic semiconductor materials will be described below.

In addition, an array of photoelectric conversion elements 23 and an array of switching devices 24 may be formed in one and the same layer, or the array of switching devices 24 and the array of photoelectric conversion elements 23 in order may be formed in different layers from the scintillator 11 side. As in the illustrated example, it is preferable that the array of photoelectric conversion elements 23 and the array of switching devices 24 in order may be formed in different layers from the scintillator 11 side. When the array of photoelectric conversion elements 23 and the array of switching devices 24 are formed in different layers each other, the size of the photoelectric conversion element 23 can be increased. In addition, when the array of photoelectric conversion elements 23 and the array of switching devices 24 in order are formed from the scintillator 11 side, the array of photoelectric conversion elements 23 can be disposed more closely to the scintillator 11, and thus, the sensitivity can be improved.

Figure 4:
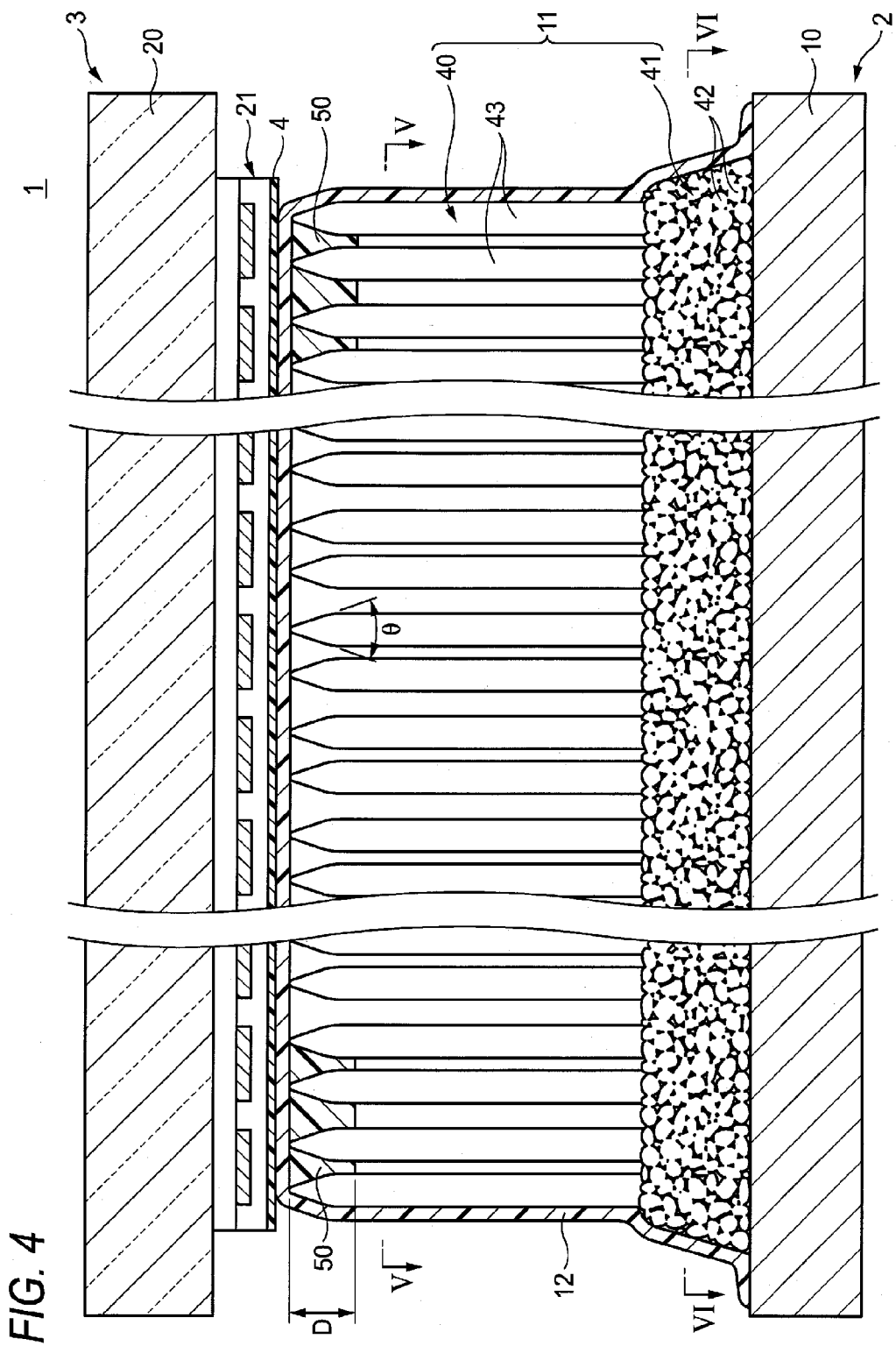
FIG. 4 is a view schematically illustrating the configuration of a radiological image conversion panel of the radiological image detection apparatus in FIG. 1.

FIG. 4 illustrates the configuration of a radiological image conversion panel 2.

The scintillator 11 includes a columnar portion 40 and a non-columnar portion 41, and the columnar portion 40 and the non-columnar portion 41 are formed by overlapping the columnar portion 40 and the non-columnar portion 41 in order on the supporting substrate 10. The scintillator 11 is covered with a protective film 12 having moisture proof property.

The columnar portion 40 is formed out of a group of columnar crystals 43 which are obtained by growing crystals of the aforementioned fluorescent material into columnar shapes. Also, there may be a case where a plurality of adjacent columnar crystals are coupled to form one columnar crystal. An air gap is put between adjacent columnar crystals 43 so that the columnar crystals 43 exist independently of one another.

The non-columnar portion 41 is formed out of a group of comparatively small granular crystals 42 of the fluorescent material. Also, there may be a case where the non-columnar portion 41 includes an amorphous material of the aforementioned fluorescent material. In the non-columnar portion 41, the granular crystals are irregularly coupled or sometimes exist through polymerization.

The supporting substrate 10 is not limited to a substrate as long as the scintillator 11 can be formed thereon. For example, a carbon plate, a carbon fiber reinforced plastic (CFRP) plate, a glass plate, a quartz substrate, a sapphire substrate, and a metal sheet selected from, for example, iron, tin, chromium or aluminum may be used as the supporting substrate 10.

For example, CsI:Tl (thallium doped cesium iodide), NaI:Tl (thallium doped sodium iodide), and CsI:Na (sodium doped cesium iodide) may be used as the fluorescent materials for forming the scintillator 11. Among them, CsI:Tl is preferred because the emission spectrum thereof conforms to the maximum value (around 550 nm) of spectral sensitivity of an amorphous silicon photodiode.

As the protective film 12, poly-paraxylene is typically used and formed as a film on the surface of the scintillator 11 by a vapor deposition method. The film made of polymer compounds which have a low permeability such as polyethylene terephthalate (PET), polyester, polymethacrylate, nitrocellulose, cellulose acetate, polypropylene and polyethylene terephthalate can be used as the protective film 12.

The scintillator 11 is bonded to pixel array 21 from the side (the fluorescence emitting surface) constituted by a set of the tip parts of columnar crystals 43. The fluorescence generated in scintillator 11 by the radiation exposure is emitted toward pixel array 21 from the fluorescence emitting surface constituted by the set of the tip parts of columnar crystals 43.

The fluorescence generated in each columnar crystal 43 is totally reflected in the columnar crystal 43 repeatedly caused by a difference in refractive index between the columnar crystal 43 and an air gap surrounding the columnar crystal 43, so as to be restrained from being diffused, and thus guided to the pixel array 21. Thus, the sharpness of the image is improved.

In addition, the tip part of the columnar crystal 43 is formed in a sharply tapered shape. Since the tip part of columnar crystal 43 is formed in this convex shape, its light extraction efficiency becomes higher and its sensitivity is improved compared to the one in the flat or concave shape. The angle $\theta$ of the tip part is preferably 40 degrees to 80 degrees.

In addition, of the fluorescence generated in each columnar crystal 43, the fluorescence travelling toward the opposite side to the pixel array 21, that is, toward the supporting substrate 10, is reflected toward the pixel array 21 by the non-columnar portion 41. Thus, the utilization efficiency of the fluorescence is enhanced so that the sensitivity is improved.

In addition, the non-columnar portion 41 is dense compared to the columnar portion 40, and its porosity is small Since the non-columnar portion 41 is interposed between the supporting substrate 10 and the columnar portion 40, the adhesion of the supporting substrate 10 and the scintillator 11 is improved, and thus the scintillator 11 is prevented from being peeled from the supporting substrate 10.

Figure 5:
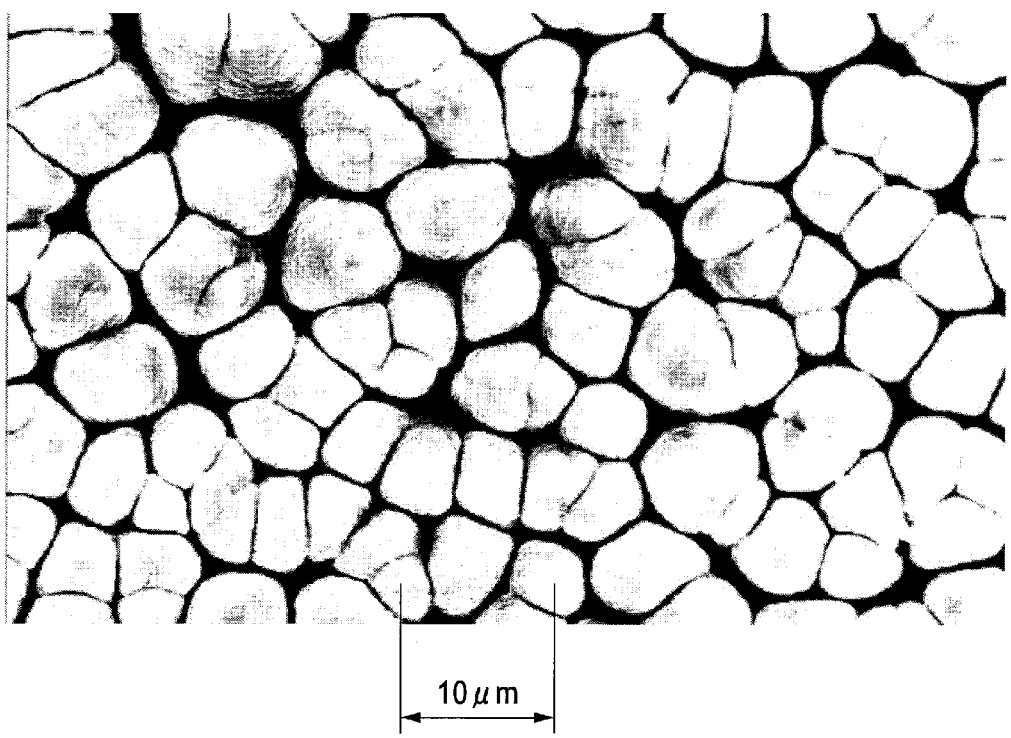
FIG. 5 is a sectional view of the phosphors of the radiological image conversion panel taken on line V-V in FIG. 4.

FIG. 5 illustrates an electron microscope photograph illustrating a section of the scintillator 11 taken on line V-V in FIG. 4.

As is apparent from FIG. 5, it is understood that, in the columnar portion 40, each columnar crystal 43 illustrates a substantially uniform sectional diameter with respect to the growth direction of the crystal, and the columnar crystal 43 exist independently of one another due to an air gap around each columnar crystal 43. It is preferable that the crystal diameter (columnar diameter) of each columnar crystal 43 is not smaller than 2 μm and not larger than 8 μm, from the viewpoint of light guide effect, mechanical strength and pixel defect prevention. When the columnar diameter is too small, each columnar crystal 43 is lack of mechanical strength so that there is a fear that the columnar crystal 43 may be damaged by a shock or the like. When the columnar diameter is too large, the number of columnar crystals 43 for each pixel is lowered so that there is a fear that it is highly likely that the pixel may be defective when one of the crystals corresponding thereto is cracked.

Here, the columnar diameter designates the maximum diameter of a columnar crystal 43 observed from above in the growth direction of the crystal. As for a specific measurement method, the columnar diameter of each columnar crystal 43 is measured by observation in a scanning electron microscope (SEM) from the growth-direction top of the columnar crystal 43. The observation is performed in the magnification (about 2,000 times) with which 100 to 200 columnar crystals 43 can be observed in each shot. The maximum values of columnar diameters of all the crystals taken in the shot are measured and averaged, and an average value obtained thus is used. The columnar diameters (μm) are measured up to two places of decimals, and the average value is rounded in the two places of decimals according to JIS Z8401.

Figure 6:
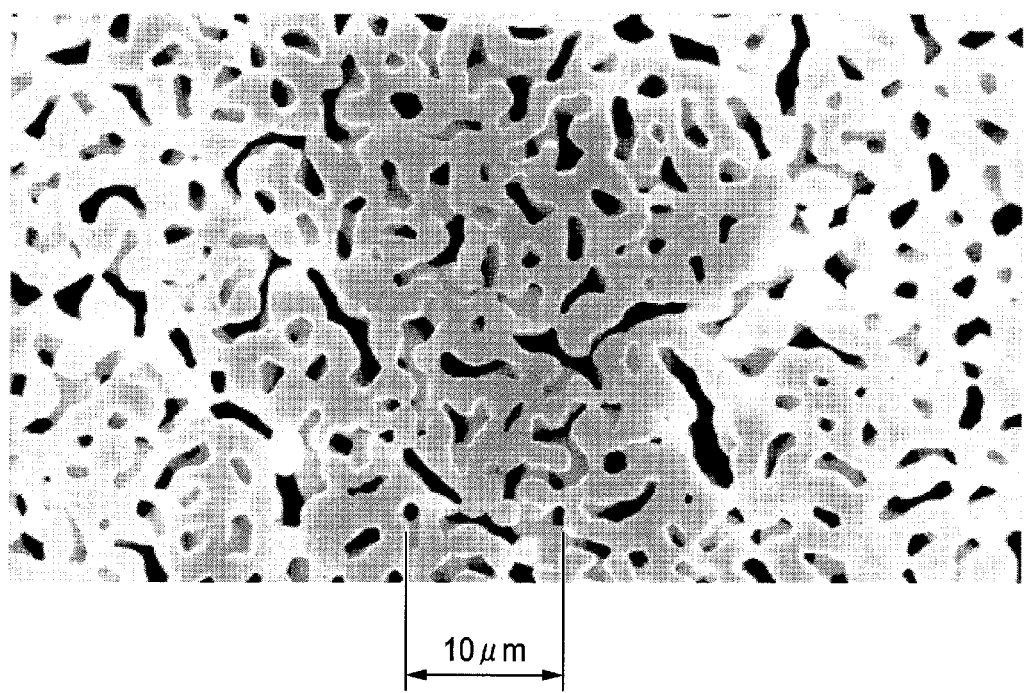
FIG. 6 is a sectional view of the phosphors of the radiological image conversion panel taken on line VI-VI in FIG. 4.

FIG. 6 illustrates an electron microscope photograph illustrating a section of the scintillator 11 taken on line VI-VI in FIG. 4.

As is apparent from FIG. 6, in the non-columnar portion 41, the granular crystal 42 are irregularly coupled or polymerized so that no distinct air gap among the crystals can be recognized in comparison with the columnar portion 40. From the viewpoint of adhesion and optical reflection, it is preferable that the diameter of each granular crystal 42 forming the non-columnar portion 41 is not smaller than 0.5 μm and not larger than 7.0 μm. When the crystal diameter is too small, the void ratio is close to zero so that there is a fear that the function of optical reflection may deteriorate. When the crystal diameter is too large, the flatness deteriorates so that there is a fear that the adhesion to the supporting substrate 10 may deteriorate. In addition, from the viewpoint of optical reflection, it is preferable that the shape of each granular crystal 42 forming the non-columnar portion 41 is substantially spherical.

Here, when the crystal is coupled with each other in the non-columnar portion 41, the crystal diameter of each crystal is measured as follows. That is, a line obtained by connecting recesses (concaves) generated between the adjacent crystals is regarded as the boundary between the crystals. The crystals coupled with each other are separated to have minimum polygons and thus the crystal diameter can be measured. An average value of the crystal diameters is obtained in the same manner as the crystal diameter in the columnar portion 40, and the average value thus obtained is used.

The thickness of the columnar portion 40 depends on the energy of radiation but is preferably not smaller than 200 μm and not larger than 700 μm in order to secure sufficient radiation absorption in the columnar portion 40 and sufficient image sharpness. When the thickness of the columnar portion 40 is too small, radiation cannot be absorbed sufficiently so that there is a fear that the sensitivity may deteriorate. When the thickness is too large, optical diffusion occurs so that there is a fear that the image sharpness may deteriorate in spite of the light guide effect of the columnar crystal 43.

It is preferable that the thickness of the non-columnar portion 41 is not smaller than 5 μm and not larger than 125 μm from the viewpoint of adhesion to the supporting substrate 10 and optical reflection. When the thickness of the non-columnar portion 41 is too small, there is a fear that sufficient adhesion to the supporting substrate 10 cannot be obtained. When the thickness of the non-columnar portion 41 is too large, contribution of fluorescence in the non-columnar portion 41 and diffusion caused by optical reflection in the non-columnar portion 41 are increased so that there is a fear that the image sharpness may deteriorate.

The non-columnar portion 41 and the columnar portion 40 are formed integrally and continuously in that order on the supporting substrate 10, for example, by a vapor deposition method. Specifically, under the environment with a vacuum degree of 0.01 Pa to 10 Pa, CsI:Tl is heated and evaporated by means of resistance heating crucibles to which electric power is applied. Thus, CsI:Tl is deposited on the supporting substrate 10 whose temperature is set at a room temperature (20° C.) to 300° C.

At the beginning of formation of a crystal phase of CsI:Tl on the supporting substrate 10, comparatively small-diameter granular crystals 42 are deposited to form the non-columnar portion 41. At least one of the conditions, that is, the degree of vacuum or the temperature of the supporting substrate 10 is then changed. Thus, the columnar portion 40 is formed continuously after the non-columnar portion 41 is formed. Specifically, the degree of vacuum and/or the temperature of the supporting substrate 10 are increased so that a group of columnar crystals 43 are grown.

Moreover, the shape of the tip part (tip angle θ) of the columnar crystal 43 can be controlled by controlling the temperature of the supporting substrate 10 at the end of the growth of columnar crystal 43. The angle is generally 170 degrees at 110° C., 60 degrees at 140° C., 70 degrees at 200° C., and 120 degrees at 260° C.

In the aforementioned manner, the scintillator 11 can be manufactured more efficiently and easily. In addition, according to the manufacturing method, there is another advantage that scintillators of various specifications can be manufactured easily in accordance with their designs when the degree of vacuum or the temperature of the supporting substrate is controlled in formation of the scintillator 11.

In the scintillator 11 constructed as above, the filler 50 is filled on the tip parts of a group of columnar crystals 43 existed at all around circumferential edge portions. Because the filler 50 is filled between the group of columnar crystals 43 at the circumferential edge portions, the edge portions of the fluorescence emitting surface of the scintillator 11 which is bonded with the pixel array 21 is flattened.

The fluorescence emitting surface of the scintillator 11 is composed by a set of columnar crystals 43 and there are a number of empty places. In particular, at the present example, the each of the tip part of the columnar crystal 43 is formed as a sharply tapered shape from the viewpoint of the light extraction efficiency. Therefore, if the filler 50 is not existed, when the scintillator 11 and the pixel array 21 are joined, the close area by applying a load on the adhesive layer 4 from the fluorescence emitting surface of the scintillator 11 is limited to a small area of the tip part of columnar crystal 43. Thus, in the fluorescence emitting surface of the scintillator 11, the edge portion of the fluorescence emitting surface is bonded closely by applying a load to the all over the adhesive layer 4, because that the edge portion is flatten by the filler 50.

In addition, the filler 50 is filled between the tip parts of a group of columnar crystals 43 at the edge portions of the scintillator 11, and thus the tip parts of the columnar crystals 43 are integrated. When the scintillator 11 and the pixel array 21 are bonded, there is a load applied on the scintillator 11, but the tip parts of the columnar crystals 43 are integrated by the filler 50, the load is distributed to a great number of columnar crystals 43, and thus each of columnar crystal 43 is prevented from being damaged.

As above mentioned, the edge portions of the fluorescence emitting surface of the scintillator 11 can be closed by applying a sufficient load to all over the adhesive layer 4, and thus the sufficient adhesion strength can be obtained between the adhesive layer 4 and the edge portions of the fluorescence emitting surface. Accordingly, the peeling of the scintillator 11 and the pixel array 21 can be prevented which is started at the edge portion of the fluorescence emitting surface.

Here, the light guide effect of the columnar crystal 43 is to use a total reflection due to the difference between the refractive index of the columnar crystal 43 and that of the surrounding medium. When the filler 50 is filled between a group of columnar crystals 43, the difference between the refractive index of columnar crystal 43 at the filled part and that of the surrounding medium will be reduced, and thus the light guide effect may be weakened. However, in the radiography using the radiological image detection apparatus 1, the area of interest of the subject is typically disposed such that the middle part of the pixel array 21 is overlapped. Since the edge portions of the scintillator 11 are overlapped at the outer of the effective imaging area of the pixel array 21 or superimposed on the edge portions of the effective imaging area, the weakening of the light guide effect of the columnar crystal 43 at the edge portions of scintillator 11 does little affect the image quality of the area of interest. Therefore, in the edge portions of the scintillator 11, the filling depth D of the filler 50 between a group of columnar crystals 43 can be set in considering the fixation strength of the filler 50 to the columnar crystal 43.

In the present example, the tip part of the columnar crystal 43 is formed as a sharply tapered shape, and when considering the fixation strength of the filler 50 to the columnar crystal 43, it is preferable that the filler 50 is filled until the deep part between the columnar crystals 43 beyond the tip part (tapered part) of the columnar crystal 43.

As the filler 50, the energy curing resin material which is transparent to the fluorescence generated at the scintillator 11 and has an adequate liquidity can be used appropriately. Specifically, for example, phenol resin, urea resin, melamine resin, unsaturated polyester resin, epoxy resin, and diaryl phtalate resin can be listed as an example.

The filler 50 is filled between the group of columnar crystals 43 at the edge portions of the scintillator 11, for example, by applying an amount of the filler 50 on the edge portions of the fluorescence emitting surface of the scintillator 11 and pressurizing the applied filler 50.

As described above, in accordance with the radiological image detection apparatus 1, since the filler 50 is filled between the group of columnar crystals 43 at the edge portions of the scintillator 11, the edge portions of the fluorescence emitting surface of the scintillator 11 can be flattened and the strength of columnar crystal 43 at the edge portions can increased. Accordingly, the edge portions of the fluorescence emitting surface of the scintillator 11 can be close by applying a sufficient load to the adhesive layer 4 and the sufficient adhesion strength between the fluorescence emitting surface and the adhesive layer 4 can be obtained. Thus, the peeling of the scintillator 11 with the pixel array 21 can be prevented from being occurred.

In addition, the center portion of the scintillator 11 has a significant impact on the image quality of the area of interest of the subject, and thus the weakening of the light guide effect of the columnar crystal 43 can be suppressed without filling between the group of columnar crystals 43 at the center with the filler 50 (by the filling depth of 0). Therefore, the degradation of the image quality of the area of interest of the subject can be also suppressed.

In addition, in the radiological image detection apparatus 1, it is explained that the radiation was incident thereto from the sensor panel 3 side, but the configuration that the radiation is incident from radiological image conversion panel 2 side can be considered.

FIG. 7 illustrates the configuration of the example of the modification of the radiological image detection apparatus 1.

In the radiological image detection apparatus 101 illustrated in FIG. 7, the filler 50 is filled between the group of columnar crystals 43 across the scintillator 11 at the tip parts side thereof. However, the filling depth D1 of the filler 50 at the center portion is smaller than the filling depth D2 of the filler 50 at the edge portions.

The filler 50 is filled between the group of columnar crystals 43 across the scintillator 11, and thus the entire fluorescence emitting surface of the scintillator 11 can be flattened and the tip parts of the columnar crystals 43 can be integrated. Accordingly, the entire fluorescence emitting surface of the scintillator 11 can be closed by applying a sufficient load to the adhesive layer 4, and the sufficient adhesion strength between the entire fluorescence emitting surface and the adhesive layer 4 can be obtained. Accordingly, the peeling of the scintillator 11 with the pixel array 21 can be more securely prevented from being occurred.

Moreover, the filling depth D1 of the filler 50 at the center portion of the scintillator 11 is smaller than the filling depth D2 of the filler 50 at the edge portions thereof, and thus the deterioration of the image quality can be suppressed. In other words, the area of interest of the subject is typically disposed in the center part of the pixel array 21 to be overlapped and the center portion of the scintillator 11 is superimposed on the center part of the effective imaging area of the pixel array 21. Therefore, the weakening of the light guide effect of the columnar crystal 43 at the center portion has a greater impact to the image quality of the area of interest of the radiation image, compared to the weakening of the light guide effect of the columnar crystal 43 at the edge portions. Thus, the filling depth D1 of the filler 50 at the center portion can be relatively smaller, the weakening of the light guide effect of the columnar crystal 43 at the center portion can be suppressed, and the deterioration of the image quality of the radiation image can be suppressed.

In addition, the filler 50 is filled between the group of columnar crystals 43 across the scintillator 11, and thus the protective film 12 can be prevented from being inserted between columnar crystals 43. The above described poly-paraxylene can be used as the protective film 12, but the refractive index of the film is bigger compared to that of air (1.0). Thus, if the protective film 12 is inserted between the group of columnar crystals 43, the difference between the refractive index of the columnar crystal 43 at the corresponding part and that of the surrounding medium becomes small, the light guide effect is weakened, and the sharpness of the image is degraded. Therefore, the filler 50 can be filled between the group of columnar crystals 43 so that protective film 12 can be prevented from being inserted between the group of columnar crystals 43.

It is preferable that the filler 50 has a smaller refractive index than that of columnar crystal 43 from the viewpoint of suppressing the light guide effect of columnar crystal 43 due to the filler 50. In addition, it is preferable that the refractive index of the filler 50 is smaller than that of the protective film 12 from the viewpoint of suppressing the weakening of the light guide effect of columnar crystal 43 by the protective film 12. For example, it is preferable that the refractive index of filler 50 is not more than 1.6, in considering that the refractive index of CsI which is used as a phosphor forming a columnar crystal 43 is 1.79, and moreover the refractive index of the poly-paraxylene which is used as a protective film 12 is 1.639. The refractive index of the materials illustrated above as a filler 50 changes depending on the grade of it, but that of phenol resin is 1.58 to 1.66, that of urea resin is 1.54 to 1.56, that of melamine resin is 1.6 to 1.7, that of unsaturated polyester resin is 1.52 to 1.57, that of epoxy resin is 1.55 to 1.61, and that of diaryl phtalate resin is 1.51 to 1.52.

The filler 50 is filled between the group of columnar crystals 43 at the edge portions of the scintillator 11 by, for example, applying an amount of it on the fluorescence emitting surface of the scintillator 11 and pressurizing it. Herein, the filling depth of the filler 50 can be distributed as described above between the group of columnar crystals 43 by reducing the amount of the filler 50 applied at the center portion less than that at the edge portions of the fluorescence emitting surface.

Since the aforementioned radiological image detection apparatus can detect a radiological image with high sensitivity and high definition, it can be installed and used in an X-ray imaging apparatus for the purpose of medical diagnosis, such as a mammography apparatus, required to detect a sharp image with a low dose of radiation, and other various apparatuses. For example, the radiological image detection apparatus is applicable to an industrial X-ray imaging apparatus for nondestructive inspection, or an apparatus for detecting particle rays ($\alpha$-rays, $\beta$-rays, $\gamma$-rays) other than electromagnetic waves. The radiological image detection apparatus has a wide range of applications.

Description will be made below on materials which can be used for constituent members of the sensor panel 3.

[Photoelectric Conversion Element]

A film (hereinafter referred to as OPC film) formed out of an OPC (Organic Photoelectric Conversion) material disclosed in JP-A-2009-32854 may be used for the photoconductive layer 25 (see FIG. 2) of the photoelectric conversion elements 23. The OPC film contains an organic photoelectric conversion material, absorbing light emitted from a phosphor and generating electric charges in accordance with the absorbed light. Such an OPC film containing an organic photoelectric conversion material has a sharp absorption spectrum in a visible light range. Thus, electromagnetic waves other than light emitted from the phosphor are hardly absorbed by the OPC film, but noise generated by radiation such as X-rays absorbed by the OPC film can be suppressed effectively.

It is preferable that the absorption peak wavelength of the organic photoelectric conversion material forming the OPC film is closer to the peak wavelength of light emitted by the phosphor in order to more efficiently absorb the light emitted by the phosphor. Ideally, the absorption peak wavelength of the organic photoelectric conversion material agrees with the peak wavelength of the light emitted by the phosphor. However, if the difference between the absorption peak wavelength of the organic photoelectric conversion material and the peak wavelength of the light emitted by the phosphor is small, the light emitted by the phosphor can be absorbed satisfactorily. Specifically, the difference between the absorption peak wavelength of the organic photoelectric conversion material and the peak wavelength of the light emitted by the phosphor in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI(Tl) is used as the phosphor material, the aforementioned difference in peak wavelength can be set within 5 nm so that the amount of electric charges generated in the OPC film can be increased substantially to the maximum.

At least a part of an organic layer provided between the bias electrode 26 and the electric charge collection electrode 27 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the phosphor. The photoelectric conversion film is preferably not thinner than 30 nm and not thicker than 300 nm, more preferably not thinner than 50 nm and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-32854.

[Switching Device]

Organic materials, for example, as disclosed in JP-A-2009-212389, may be used for an active layer of each switching device 24. Although the organic TFT may have any type of structure, a field effect transistor (FET) structure is the most preferable. In the FET structure, a gate electrode is provided on a part of an upper surface of an insulating substrate, and an insulator layer is provided to cover the electrode and touch the substrate in the other portion than the electrode. Further, a semiconductor active layer is provided on an upper surface of the insulator layer, and a transparent source electrode and a transparent drain electrode are disposed on a part of an upper surface of the semiconductor active layer and at a distance from each other. This configuration is called a top contact type device. However, a bottom contact type device in which a source electrode and a drain electrode are disposed under a semiconductor active layer may be also used preferably. In addition, a vertical transistor structure in which a carrier flows in the thickness direction of an organic semiconductor film may be used.

(Active Layer)

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0*10^{-7}$ cm²/Vs, more preferably not lower than $1.0*10^{-6}$ cm²/Vs, further preferably not lower than $1.0*10^{-5}$ cm²/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

A phthalocyanine compound or a naphthalocyanine compound may be exemplified as such a p-type organic semiconductor material. A specific example thereof is shown as follows. M represents a metal atom, Bu represents a butyl group, Pr represents a propyl group, Et represents an ethyl group, and Ph represents a phenyl group.

[Chemical 1]

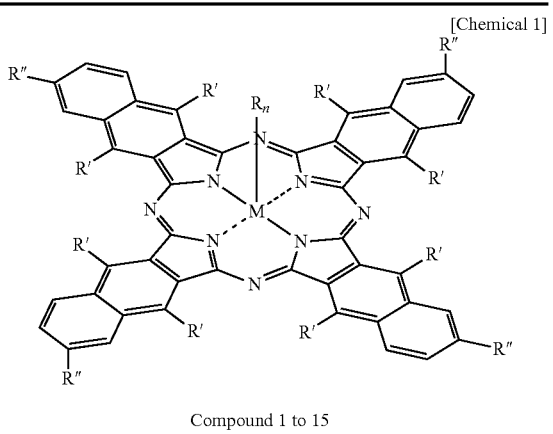

Compound 1 to 15

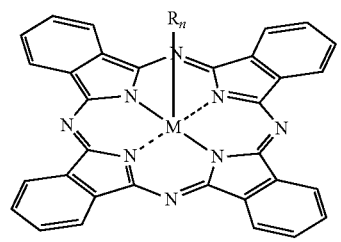

Compound 16 to 20

| Compound | M | R | N | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | Ni | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Constituent Members of Switching Device Other than Active Layer)

The material forming the gate electrode, the source electrode or the drain electrode is not limited particularly if it has required electric conductivity. Examples thereof include: transparent electrically conductive oxides such as ITO (indium-doped tin oxide), IZO (indium-doped zinc oxide), SnO$_2$, ATO (antimony-doped tin oxide), ZnO, AZO (aluminum-doped zinc oxide), GZO (gallium-doped zinc oxide), TiO$_2$, FTO (fluorine-doped tin oxide), etc.; transparent electrically conductive polymers such as PEDOT/PSS (poly(3,4-ethylenedioxythiophene)/polystyrenesulfonate); carbon materials such as carbon nanotube; etc. These electrode materials may be formed into films, for example, by a vacuum deposition method, sputtering, a solution application method, etc.

The material used for the insulating layer is not limited particularly as long as it has required insulating effect. Examples thereof include: inorganic materials such as silicon dioxide, silicon nitride, alumina, etc.; and organic materials such as polyester (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a vacuum deposition method, sputtering, a solution application method, etc.

As for any other configuration about the aforementioned organic TFT, for example, refer to the description in JP-A-2009-212389.

In addition, for example, amorphous oxide disclosed in JP-A-2010-186860 may be used for the active layer of the switching devices 24. Here, description will be made on an amorphous oxide containing active layer belonging to an FET transistor disclosed in JP-A-2010-186860. The active layer serves as a channel layer of the FET transistor where electrons or holes can move.

The active layer is configured to contain an amorphous oxide semiconductor. The amorphous oxide semiconductor can be formed into a film at a low temperature. Thus, the amorphous oxide semiconductor can be formed preferably on a flexible substrate. The amorphous oxide semiconductor used for the active layer is preferably of amorphous oxide containing at least one kind of element selected from a group consisting of In, Sn, Zn and Cd, more preferably of amorphous oxide containing at least one kind of element selected from a group consisting of In, Sn and Zn, further preferably of amorphous oxide containing at least one kind of element selected from a group consisting of In and Zn.

Specific examples of the amorphous oxide used for the active layer include $In_2O_3$, ZnO, $SnO_2$, CdO, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is suitable. Further, the sputtering method is preferred in view from mass productivity. For example, the active layer is formed by an RF magnetron sputtering deposition method with a controlled degree of vacuum and a controlled flow rate of oxygen.

By a known X-ray diffraction method, it can be confirmed that the active layer formed into a film is an amorphous film. The composition ratio of the active layer is obtained by an RBS (Rutherford Backscattering Spectrometry) method.

In addition, the electric conductivity of the active layer is preferably lower than $10^2$ $Scm^{-1}$ and not lower than $10^{-4}$ $Scm^{-1}$, more preferably lower than $10^2$ $Scm^{-1}$ and not lower than $10^{-1}$ $Scm^{-1}$. Examples of the method for adjusting the electric conductivity of the active layer include an adjusting method using oxygen deficiency, an adjusting method using a composition ratio, an adjusting method using impurities, and an adjusting method using an oxide semiconductor material, as known.

As for any other configuration about the aforementioned amorphous oxide, for example, refer to description in JP-A-2010-186860.

[Insulating Substrate]

Examples of the material of the insulating substrate 20 include a plastic film superior in optical transparency, etc. Examples of the plastic film include films made from polyethylene terephthalate (PET), polyethylene naphthalate (PEN), polyether sulfone (PES), polyether imide, polyetheretherketone, polyphenylene sulfide, polycarbonate (PC), cellulose triacetate (TAC), cellulose acetate propionate (CAP), polyimide, polyalylate, biaxial oriented polystyrene (OPS), etc. In addition, organic or inorganic filler may be contained in these plastic films. A flexible board formed out of aramid, bionanofiber, or the like, having properties, such as flexibility with low thermal expansion and high strength, that cannot be obtained by existing glass or plastic, may be used preferably. Of these, polyalylate (glass transition temperature: about 193° C.) with heat resistance, biaxial oriented polystyrene (decomposition temperature: 250° C.), polyimide (glass transition temperature: about 300° C.), aramid (glass transition temperature: about 315° C.), etc. can be used preferably. In this manner, a scintillator can be formed directly on an insulating substrate in the same manner as the scintillator 11 in the radiological image detection apparatus 101.

(Aramid)

An aramid material has high heat resistance showing a glass transition temperature of 315° C., high rigidity showing a Young's modulus of 10 GPa, and high dimensional stability showing a thermal expansion coefficient of −3 to 5 ppm/° C. Therefore, when a film made from aramid is used, it is possible to easily form a high-quality film for a semiconductor layer, as compared with the case where a general resin film is used. In addition, due to the high heat resistance of the aramid material, an electrode material can be cured at a high temperature to have low resistance. Further, it is also possible to deal with automatic mounting with ICs, including a solder reflow step. Furthermore, since the aramid material has a thermal expansion coefficient close to that of ITO (indium tin oxide), a gas barrier film or a glass substrate, warp after manufacturing is small. In addition, cracking hardly occurs. Here, it is preferable to use a halogen-free (in conformity with the requirements of JPCA-ES01-2003) aramid material containing no halogens, in view of reduction of environmental load.

The aramid film may be laminated with a glass substrate or a PET substrate, or may be pasted onto a housing of a device.

High intermolecular cohesion (hydrogen bonding force) of aramid leads to low solubility to a solvent. When the problem of the low solubility is solved by molecular design, an aramid material easily formed into a colorless and transparent thin film can be used preferably. Due to molecular design for controlling the order of monomer units and the substituent species and position on an aromatic ring, easy formation with good solubility can be obtained with the molecular structure kept in a bar-like shape with high linearity leading to high rigidity or dimensional stability of the aramid material. Due to the molecular design, halogen-free can be also achieved.

In addition, an aramid material having an optimized characteristic in an in-plane direction of a film can be used preferably. Tensional conditions are controlled in each step of solution casting, vertical drawing and horizontal drawing in accordance with the strength of the aramid film which varies constantly during casting. Due to the control of the tensional conditions, the in-plane characteristic of the aramid film which has a bar-like molecular structure with high linearity leading to easy occurrence of anisotropic physicality can be balanced.

Specifically, in the solution casting step, the drying rate of the solvent is controlled to make the in-plane thickness-direction physicality isotropic and optimize the strength of the film including the solvent and the peel strength from a casting drum. In the vertical drawing step, the drawing conditions are controlled precisely in accordance with the film strength varying constantly during drawing and the residual amount of the solvent. In the horizontal drawing, the horizontal drawing conditions are controlled in accordance with a change in film strength varying due to heating and controlled to relax the residual stress of the film. By use of such an aramid material, the problem that the aramid film after casting may be curled.

In each of the contrivance for the easiness of casting and the contrivance for the balance of the film in-plane characteristic, the bar-like molecular structure with high linearity peculiar to aramid can be kept to keep the thermal expansion coefficient low. When the drawing conditions during film formation are changed, the thermal expansion coefficient can be reduced further.

(Bionanofiber)

Components sufficiently small with respect to the wavelength of light do not generate scattering of the light. Accordingly, nanofibers can be used as reinforcement for a transparent and flexible resin material. Of the nanofibers, a composite material (occasionally referred to as bionanofiber) of bacterial cellulose and transparent resin can be used preferably. The bacterial cellulose is produced by bacteria (Acetobacter Xylinum). The bacterial cellulose has a cellulose microfibril bundle width of 50 nm, which is about 1/10 as large as the wavelength of visible light. In addition, the bacterial cellulose is characterized by high strength, high elasticity and low thermal expansion.

When a bacterial cellulose sheet is impregnated with transparent resin such as acrylic resin or epoxy resin and hardened, transparent bionanofiber showing a light transmittance of about 90% in a wavelength of 500 nm while containing a high fiber ratio of about 60 to 70% can be obtained. By the bionanofiber obtained thus, a thermal expansion coefficient (about 3 to 7 ppm) as low as that of silicon crystal, strength (about 460 MPa) as high as that of steel, and high elasticity (about 30 GPa) can be obtained.

As for the configuration about the aforementioned bio-nanofiber, for example, refer to description in JP-A-2008-34556.

As described above, radiological image conversion panels, manufacturing methods of the radiological image conversion panels and radiological image detection apparatuses in the following paragraphs are disclosed herein.

(1) A radiological image conversion panel includes: a scintillator made of a phosphor which emits fluorescence when exposed to radiation, in which a fluorescence emitting surface of the scintillator is bonded to a sensor panel having a pixel array detecting the fluorescence generated at the scintillator, through an adhesive layer, the scintillator includes a group of columnar crystals which are obtained by growing crystal of the phosphor into columnar shape, the fluorescence emitting surface is configured by a set of tip parts of the columnar crystals, at least edge portions of the fluorescence emitting surface are flattened by filling between the group of columnar crystals with filler, and the filling depth of the filler at a center portion of the fluorescence emitting surface is smaller than that at the edge portions of the fluorescence emitting surface.

(2) In the radiological image conversion panel according to (1): it may be that the filler is filled between the group of columnar crystals only at the edge portions of the fluorescence emitting surface.

(3) In the radiological image conversion panel according to (2): it may be that tip parts of the columnar crystals at the edge portions are integreated.

(4) In the radiological image conversion panel according to (1): it may be that the filler is filled between the group of columner crystals accorss the scitillator to flatten the entire fluorescence emitting surface.

(5) In the radiological image conversion panel according to (4): it may be that all tip parts of the columnar crystals are integreated.

(6) In the radiological image conversion panel according to (1): it may be that the tip part of the columnar crystal is formed as a sharply tapered shape.

(7) In the radiological image conversion panel according to (6): it may be that an angle of the tip part of the columnar crystal is 40° to 80°.

(8) In the radiological image conversion panel according to (6): it may be that a filling depth of the filler at the edge portions of the fluorescence emitting surface is greater than the length of the tip part of the columnar crystal.

(9) In the radiological image conversion panel according to (1): it may be that a refractive index of the filler is smaller than a refractive index of the phosphor.

(10) In the radiological image conversion panel according to (1): it may be that the scintillator is covered with a moisture proof protective film, and the refractive index of the filler is smaller than that of the protective film.

(11) In the radiological image conversion panel according to (1): it may be that energy curing resin material is used as the filler.

(12) In the radiological image conversion panel according to (1): it may be that the filler is selected from a group of phenol resin, urea resin, melamine resin, unsaturated polyester resin, epoxy resin, and diaryl phtalate resin.

(13) In the radiological image conversion panel according to (1): it may be that the edge portions of the fluorescence emitting surface are overlapped with the outside of an effective imaging area of the pixel array, when the fluorescence emitting surface is bonded to the sensor panel.

(14) In the radiological image conversion panel according to (1): it may be that the edge portions of the fluorescence emitting surface are superimposed on edge portions of an effective imaging area of the pixel array, when the fluorescence emitting surface is bonded to the sensor panel.

(15) In the radiological image conversion panel according to (1): it may be that the scintillator has a fluoresent mateial of CsI:Tl.

(16) A manufacturing method of a radiological image conversion panel includes: providing a scintillator including a group of columnar crystals which are obtained by growing crystal of a phosphor which emits fluorescence when exposed to radiation, into columnar shape, the fluorescence emitting surface of the scintillator being configured by a set of tip parts of the columnar crystals; applying energy-curing filler on at least at edge portions of the fluorescence emitting surface of the scintillator; reducing an amount of the filler held at a center portion less than that at the edge portions; pressurizing the filler applied on the fluorescence emitting surface toward the fluorescence emitting surface to fill between the group of columnar crystals with the filler; and curing the filler filled between the group of columnar crystals.

(17) A radiological image detection apparatus includes: the radiological image conversion panel according to (1); and the sensor panel having the pixel array detecting the fluorescence generated by the scintillator of the radiological image conversion panel, in which the fluorescence emitting surface of the scintillator is bonded to the sensor panel through the adhesive layer.

(18) The radiological image detection apparatus according to (17): it may be that the apparatus is used in a radiation detection method in which the radiation is incident from the sensor panel side.

What is claimed is:

1. A radiological image conversion panel comprising:
   a scintillator made of a phosphor which emits fluorescence when exposed to radiation,
   wherein a fluorescence emitting surface of the scintillator is bonded to a sensor panel having a pixel array detecting the fluorescence generated at the scintillator, through an adhesive layer,
   the scintillator includes a group of columnar crystals which are obtained by growing crystal of the phosphor into columnar shape,
   the fluorescence emitting surface is configured by a set of tip parts of the columnar crystals,
   at least edge portions of the fluorescence emitting surface are flattened by filling between the group of columnar crystals with filler, and
   the filling depth of the filler at a center portion of the fluorescence emitting surface is smaller than that at the edge portions of the fluorescence emitting surface.

2. The radiological image conversion panel according to claim 1, wherein:
   the filler is filled between the group of columnar crystals only at the edge portions of the fluorescence emitting surface.

3. The radiological image conversion panel according to claim 2, wherein:
   tip parts of the columnar crystals at the edge portions are integreated.

4. The radiological image conversion panel according to claim 1, wherein:
   the filler is filled between the group of columner crystals accorss the scitillator to flatten the entire fluorescence emitting surface.

5. The radiological image conversion panel according to claim 4, wherein:
all tip parts of the columnar crystals are integreated.

6. The radiological image conversion panel according to claim 1, wherein:
the tip part of the columnar crystal is formed as a sharply tapered shape.

7. The radiological image conversion panel according to claim 6, wherein:
an angle of the tip part of the columnar crystal is 40° to 80°.

8. The radiological image conversion panel according to claim 6, wherein:
a filling depth of the filler at the edge portions of the fluorescence emitting surface is greater than the length of the tip part of the columnar crystal.

9. The radiological image conversion panel according to claim 1, wherein:
a refractive index of the filler is smaller than a refractive index of the phosphor.

10. The radiological image conversion panel according to claim 1, wherein:
the scintillator is covered with a moisture proof protective film, and the refractive index of the filler is smaller than that of the protective film.

11. The radiological image conversion panel according to claim 1, wherein:
energy curing resin material is used as the filler.

12. The radiological image conversion panel according to claim 1, wherein:
the filler is selected from a group of phenol resin, urea resin, melamine resin, unsaturated polyester resin, epoxy resin, and diaryl phtalate resin.

13. The radiological image conversion panel according to claim 1, wherein:
the edge portions of the fluorescence emitting surface are overlapped with the outside of an effective imaging area of the pixel array, when the fluorescence emitting surface is bonded to the sensor panel.

14. The radiological image conversion panel according to claim 1, wherein:
the edge portions of the fluorescence emitting surface are superimposed on edge portions of an effective imaging area of the pixel array, when the fluorescence emitting surface is bonded to the sensor panel.

15. The radiological image conversion panel according to claim 1, wherein:
the scintillator has a fluoresent mateial of CsI:Tl.

16. A radiological image detection apparatus comprising:
the radiological image conversion panel according to claim 1; and
the sensor panel having the pixel array detecting the fluorescence generated by the scintillator of the radiological image conversion panel,
wherein the fluorescence emitting surface of the scintillator is bonded to the sensor panel through the adhesive layer.

17. The radiological image detection apparatus according to claim 16, wherein:
the apparatus is used in a radiation detection method in which the radiation is incident from the sensor panel side.

18. A manufacturing method of a radiological image conversion panel comprising:
providing a scintillator including a group of columnar crystals which are obtained by growing crystal of a phosphor which emits fluorescence when exposed to radiation, into columnar shape, the fluorescence emitting surface of the scintillator being configured by a set of tip parts of the columnar crystals;
applying energy-curing filler on at least at edge portions of the fluorescence emitting surface of the scintillator;
reducing an amount of the filler held at a center portion less than that at the edge portions;
pressurizing the filler applied on the fluorescence emitting surface toward the fluorescence emitting surface to fill between the group of columnar crystals with the filler; and
curing the filler filled between the group of columnar crystals.

* * * * *